(12) United States Patent  (10) Patent No.: US 9,617,811 B2
Thiessen  (45) Date of Patent: Apr. 11, 2017

(54) DRILLING MUD COOLING SYSTEM

(71) Applicant: National Oilwell Varco, L.P., Houston, TX (US)

(72) Inventor: Jay John Thiessen, Edmonton, CA (US)

(73) Assignee: National Oilwell Varco, L.P., Houston, TX (US)

( * ) Notice: Subject to any disclaimer, the term of this patent is extended or adjusted under 35 U.S.C. 154(b) by 308 days.

(21) Appl. No.: 14/276,671

(22) Filed: May 13, 2014

(65) Prior Publication Data

US 2015/0330165 A1  Nov. 19, 2015

(51) Int. Cl.
| | |
|---|---|
| *E21B 21/06* | (2006.01) |
| *B01D 33/03* | (2006.01) |
| *B01D 35/18* | (2006.01) |
| *E21B 36/00* | (2006.01) |
| *E21B 21/01* | (2006.01) |

(52) U.S. Cl.
CPC ........ *E21B 21/065* (2013.01); *B01D 33/0346* (2013.01); *B01D 35/18* (2013.01); *E21B 21/01* (2013.01); *E21B 36/001* (2013.01)

(58) Field of Classification Search
CPC .............................. E21B 21/065; B01D 35/18
See application file for complete search history.

(56) References Cited

U.S. PATENT DOCUMENTS

| | | | | |
|---|---|---|---|---|
| 2,359,923 A | * | 10/1944 | Lawless | E21B 21/06 210/402 |
| 2,748,884 A | * | 6/1956 | Erwin | E21B 21/067 175/206 |
| 3,399,739 A | * | 9/1968 | Goodwin | E21B 7/18 175/206 |
| 3,713,499 A | | 1/1973 | Arscott et al. | |
| 3,859,812 A | | 1/1975 | Pavlak | |
| 3,876,367 A | * | 4/1975 | Vorobeichikov | F27B 7/38 432/116 |
| 4,215,753 A | | 8/1980 | Champness | |
| 4,790,933 A | * | 12/1988 | Quigley | B01D 35/18 175/48 |

(Continued)

FOREIGN PATENT DOCUMENTS

WO  2004055320 A1  7/2004

OTHER PUBLICATIONS

Partial International Search Report of PCT/US2015/030317, dated Nov. 3, 2015.

(Continued)

*Primary Examiner* — Shane Bomar
(74) *Attorney, Agent, or Firm* — Amerson Law Firm, PLLC

(57) ABSTRACT

A system includes a drilling mud cooling apparatus that is adapted to receive a flow of a mixture of drilling materials from a drilled wellbore during a drilling operation, and to cool the mixture from a first temperature to a second temperature, wherein the cooled mixture of drilling materials includes cooled drilling mud and drill cuttings. The disclosed system further includes a shale shaker apparatus that is adapted to receive a flow of the cooled mixture of drilling materials from the drilling mud cooling apparatus and to separate at least a portion of the drill cuttings from the cooled drilling mud.

30 Claims, 11 Drawing Sheets

(56) References Cited

U.S. PATENT DOCUMENTS

| | | | |
|---|---|---|---|
| 5,005,655 | A | 4/1991 | Stokke et al. |
| 5,107,874 | A | 4/1992 | Flanigan et al. |
| 5,715,895 | A | 2/1998 | Champness et al. |
| 6,779,606 | B1 | 8/2004 | Lopez |
| 2006/0131247 | A1* | 6/2006 | Browne .................. B03C 5/00 204/559 |
| 2012/0297801 | A1 | 11/2012 | Sun et al. |
| 2013/0125842 | A1 | 5/2013 | Frick |

OTHER PUBLICATIONS

Drill Cool Systems, Inc. brochure on the Geo-Cooler.
Stacey Oil Services Ltd. internet posting re Mud Cooling Systems, Inc., 2004.
Chemwotei, "Geothermal Drilling Fluids," United Nations University, Reports 2011, No. 10, pp. 149-177.
Saito, "MWD and Downhole Motor Performance in Very High Temperature Geothermal Wells in Kakkonda, Japan," pp. 1451-1456.
Stacey Oil Services Ltd. brochure entitled "Mud Cooling Systems Overview—Haynesville".
Task Environmental Services Worldwide B.V. brochure entitled "Onshore Mudcooler T1500".
Alfalaval.com brochure entitled "Puma Onshore Drilling mud cooler".
Communication pursuant to Rules 161(1) and 162 EPC dated Dec. 23, 2016 for European Patent Application No. 15724895.6, filed on May 12, 2015 (PCT Effective).

\* cited by examiner

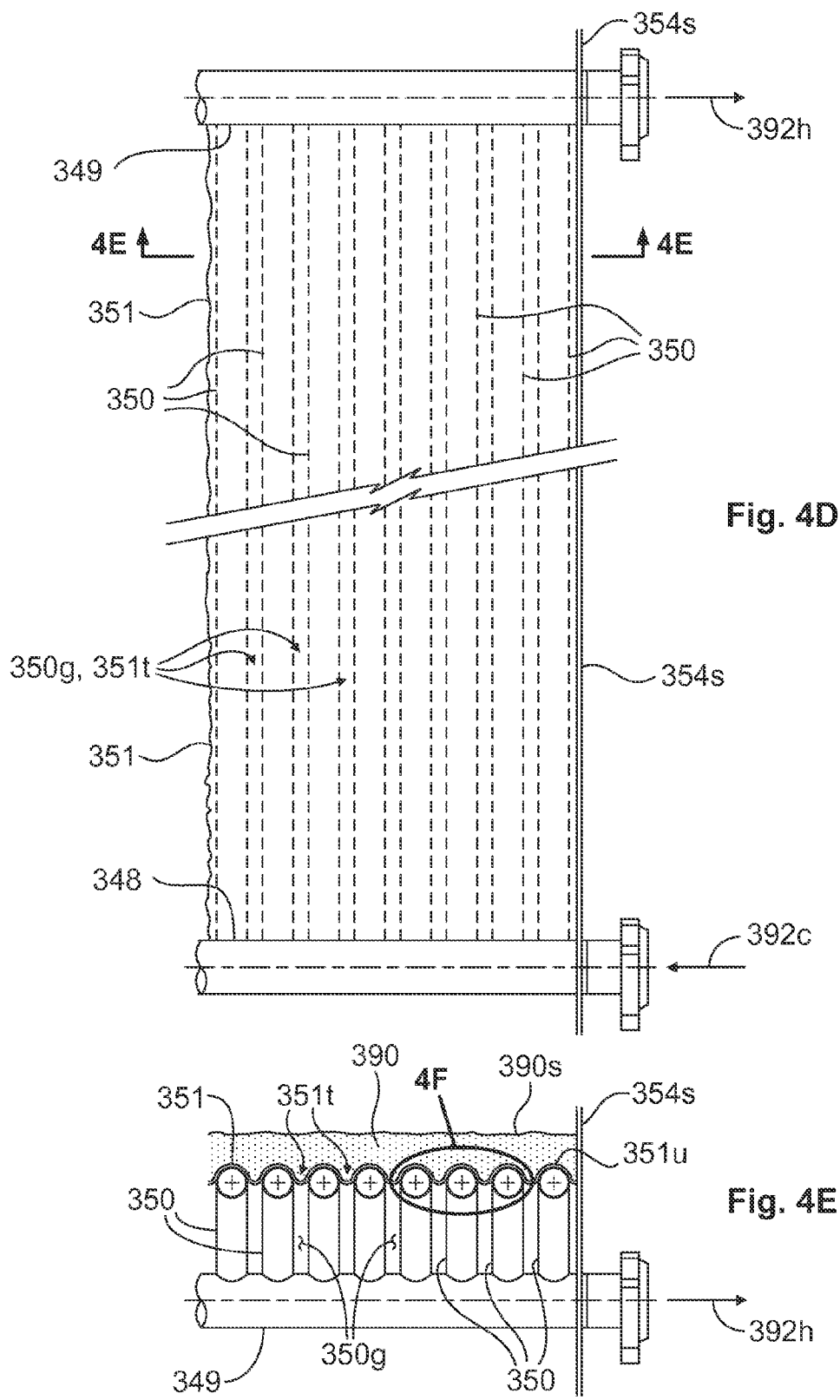

DRILLING MUD COOLING SYSTEM

BACKGROUND

1. Field of the Disclosure

The present subject matter is generally directed to drilling operations, and in particular, to systems and methods that may be used for cooling drilling mud.

2. Description of the Related Art

During a typical well drilling operation, such as when drilling an oil and gas well into the earth, a drilling mud circulation and recovery system is generally used to circulate drilling fluid, i.e., drilling mud, into and out of a wellbore. The drilling mud provides many functions and serves many useful purposes during the drilling operation, such as, for example, removing drill cuttings from the well, controlling formation pressures and wellbore stability during drilling, sealing permeable formations, transmitting hydraulic energy to the drilling tools and bit, and cooling, lubricating, and supporting the drill bit and drill assembly during the drilling operations.

Drilling muds commonly include many different types of desirable solid particles that aid in performing one or more of the functions and purposes outlined above. These solids particles used in drilling muds may have one or more particular properties which makes their presence in a particular drilling mud mixture desirable and beneficial. For example, some solids particles may need to be of a certain size or size range, which may be useful in sealing off more highly permeable formations so as to prevent the loss of valuable drilling fluid into the formation—so-called "lost circulation materials." Other solids particles may need to be of a certain density so as to control and balance forces within the wellbore, which may be added as necessary to the drilling mud as required to guard against wellbore collapse or a well blowout during the drilling operation. High density particulate materials such as barium sulfate, or barite, ($BaSO_4$), are often used for this purpose, as their greater unit volumetric weight serves to counterbalance high formation pressures and/or the mechanical forces caused by formations that would otherwise begin sloughing. In still other cases, solids particles may be added to the drilling mud based on a combination of the particle size and density, such as when a specific combination of the two properties may be desirable. Furthermore, the drilling mud in general, and the added solid particles in particular, can be very expensive. As such it is almost universally the case that upon circulation out of the wellbore, the desirable—and valuable—solids particles are generally recovered and re-used during the ongoing drilling cycle.

Once the drilling mud has served its initial purposes downhole, the mud is then circulated back up and out of the well so that it can carry the drill cuttings that are removed from the advancing wellbore during the drilling operation up to the surface. As may be appreciated, the drill cuttings, which are also solids particles, are thoroughly mixed together with the desirable solids particles that, together with various types of fluids, make up the drilling mud, and therefore must be separated from the desirable solids particles, such as barite and the like. In the best possible drilling scenario, it is advantageous for the drill cuttings to be substantially larger than the desirable solids particles making up the drilling mud, thus enabling most of the drill cuttings to be removed using vibratory separator devices that separate particles based upon size, such as shale shakers and the like. However, in most applications, a portion of the drill cuttings returning with the drilling mud are similar in size, or even smaller than, at least some of the desirable solids particles contained in the drilling mud, in which case secondary separation devices, such as hydrocyclone and/or centrifuge apparatuses, are often employed so as to obtain further particle separation.

There are a variety of reasons why it is desirable, and even necessary, to remove as many of the drill cuttings particles from the drilling mud mixture as possible. A first reason would be so as to control and/or maintain the drilling mud chemistry and composition within a desirable range as consistently as possible. For example, the presence of drill cuttings particles in the drilling mud mixture may have a significant effect on the weight of the mud, which could potentially lead to wellbore collapse, and/or a blowout scenario associated with possibly hazardous overpressure conditions within the well. More specifically, because the specific gravity of the drill cuttings particles are often significantly lower than that of the desired solids particles in the drilling mud, e.g., barite, the presence of cuttings particles left in the mud by the typical solids removal processes can cause the weight of the drilling mud to be lower than required in order to guard against the above-noted hazardous drilling conditions.

Additionally, the presence of undesirable solids materials in the drilling mud can also have an adverse effect on the flow and/or hydraulic characteristics of the mud, which, potentially, could detrimentally influence the operational efficiency of the hydraulically driven downhole tools, lubrication and cooling of the drill bit, and the like. Furthermore, depending on the types of materials (e.g., rocks/minerals) that make up the drill cuttings, the drill cuttings particles can be highly abrasive, and therefore could be damaging to the drilling mud circulation equipment, such as mud circulation pumps, seals, valves, and the like. In such cases, expensive drilling downtime may be encountered during the repair and/or replacement of inordinately worn or damaged equipment.

FIG. 1 schematically depicts one exemplary prior art system 100 that is sometimes used to circulate and treat drilling mud during a typical drilling operation. As shown in FIG. 1, a blow-out preventer (BOP) 103 is positioned on a wellhead 102 as drilling operations are being performed on a wellbore 101. In operation, drilling mud 110 mixed with drill cuttings 107 is circulated out of the wellbore 101 and exits the BOP 103 through the bell nipple 104, and thereafter flows through the flow line 105 to the drill cuttings separation equipment 106. As noted above, depending on the particle sizes of the returning drill cuttings 107 and the degree of particle separation required, the drill cuttings separation equipment 106 may include first stage separating equipment, such as one or more vibratory separators (e.g., shale shakers), as well as second stage separating equipment, such as one or more hydrocyclone and/or centrifuge apparatuses. However, for simplicity of illustration and discussion, the drill cuttings separation equipment 106 has been schematically depicted in FIG. 1 as a shale shaker device, and therefore will hereafter be referred to as the shale shaker 106.

After entering the shale shaker 106, the undesirable drill cuttings 107 are separated from the drilling mud 110 and directed to a waste disposal tank or pit 108. The separated drilling mud 110 then flows from the sump 109 of the shale shaker 106 to a mud pit or mud tank 111. Typically, the mud pit or mud tank 111 is a large container having an open top so that the drilling mud 110 can be exposed to the environment. In this way, at least some of the heat that is absorbed by the drilling mud during the drilling operation (e.g., from the surrounding formation and/or from the generation of drill cuttings) can be released to the environment, thus allowing the drilling mud 110 to naturally cool, as indicated by heat flow lines 113.

As shown in FIG. 1, the treated (e.g., cooled and/or separated) drilling mud 110 flows from the mud tank 111 to a mud pump 116 through the suction line 115. In some applications, a mud booster pump 114 may be used to deliver the drilling mud 110 through the suction line 115 and to the suction side of the mud pump 116. In operation, the mud pump 116 increases the pressure of the drilling mud 110 and discharges the pressurized drilling mud 110 to a standpipe 117, after which the mud 110 flows through a rotary line 118 to swivel 119 mounted at the upper end of a kelly 120. The kelly 120 then directs the treated drilling mud 110 down to the drill pipe/drill string 121, and the mud 110 is recirculated down the drill string 121 to a drill bit (not shown), where it once again provides, among other things, the cooling, lubrication, and drill cutting removal tasks previously described.

In some drilling applications, further enhanced drilling mud cooling is required beyond that which the system 100 of FIG. 1 is capable of providing. One such application is geothermal drilling. In general, geothermal wells are used to capture geothermal energy, which in turn can be used for heating and/or power generation applications. Therefore, many geothermal wells are, by design, drilled into formations that have significantly higher operating temperatures than most oil and gas wells. For example, in some geothermal drilling applications, the temperature of the targeted formations may be on the order of approximately 500-600° F. or even greater, a situation that can often lead to conditions wherein the temperature of the returned drilling mud/drill cuttings mixture is above 200-225° F. Such elevated mud temperatures can often have a significant detrimental effect on many of the various components of a typical mud handling system, including the mud circulation pumps, the associated seals and valves, and the like. Accordingly, a more active mud cooling system than what is depicted by the system 100 in FIG. 1 above is sometimes necessary in order to provide a greater degree of drilling mud temperature reduction, as will be further described in conjunction with FIG. 2 below.

FIG. 2 schematically depicts an illustrative prior art drilling mud circulation and treatment system 200 that is sometimes used in operations wherein higher drilling mud temperatures are generated during drilling operations, such as during geothermal drilling applications and the like. In general, several elements of the system 200 of FIG. 2 are substantially similar to corresponding elements of the previously described system 100 of FIG. 1 above. Accordingly, and where appropriate, the reference numbers used in describing the various elements of the system 200 shown in FIG. 2 substantially correspond to the reference numbers used in describing related elements of the system 100 illustrated in FIG. 1, except that the leading numeral in each figure has been changed from a "1" to a "2." For example, the mud pump "116" shown in FIG. 1 corresponds to a mud pump "216" of FIG. 2, the BOP "103" of FIG. 1 corresponds to a BOP "203" of FIG. 2, the shale shaker "106" of FIG. 1 corresponds to a shale shaker "206" of FIG. 2, and so on. Accordingly, the reference number designations used to identify some elements of the system 200 may be illustrated in FIG. 2 but may not be specifically and/or fully described below. In those instances, it should be understood that the numbered elements shown in FIG. 2 which may not be fully described below substantially correspond to their like-numbered counterparts illustrated and described in conjunction with FIG. 1 above.

As shown in FIG. 2, a hot drilling materials mixture—which, as noted above, may be at a temperature in the range of 200-225° F.—flows from the bell nipple 204 on the BOP 203 to the shale shaker 206 through the flow line 205. Once in the shale shaker 206, the hot drilling materials mixture separated as described above with respect to the system 100 such that the separated drill cuttings 207 are sent to the waste disposal pit 208 and the separated hot drilling mud 210$h$ flows down to the sump 209. Thereafter, the hot drilling mud 210$h$ flows from the sump 209 to the hot mud tank 211$h$, wherein some amount of natural or passive mud cooling 213 may occur due to exposure to the surrounding environment.

Due to the higher drilling mud temperatures encountered during a typical geothermal drilling application, the hot drilling mud 210$h$ must very often be further cooled beyond the otherwise incremental cooling 213 that occurs while the mud 210$h$ is in the hot mud tank 211$h$. Accordingly, rather than pumping the hot drilling mud 210$h$ directly from the hot mud tank 211$h$ to the mud pump 216, the hot mud 210$h$ is further cooled in a mud cooling tower 230. In the illustrative configuration shown in FIG. 2, a hot mud pump 231 is used to pump the hot drilling mud 210$h$ exiting the hot mud tank 211$h$ into the mud cooling tower 230 where it flows through a mud coil 232. As the hot mud 210$h$ passes through the mud coil 232, it is cooled by a flow of air created by an induced draft fan 233 located at the top of the cooling tower 230.

After passing through the mud coil 232, the cooled drilling mud 210$c$ exits the mud cooling tower 230 and flows to a cooled mud tank 211$c$, as shown in FIG. 2. Thereafter, a mud booster pump 214 draws the cooled drilling mud 210$c$ from the cooled mud tank 211$c$ and pumps the cooled mud 210$c$ through the suction line 215 to the mud pump 216, where it is pump again pumped into the wellbore 210 through the drill pipe 221, as described above.

The system 200 can also be configured in such a way so that it can be operated in a cooling tower bypass mode. For example, as shown in FIG. 2, appropriate valving can be positioned within the system 200 and operated in such a way as to isolate the mud cooling tower 230 from the flow of hot drilling mud 210$h$ from the hot mud tank 211 and to allow the hot mud 210$h$ to flow directly from the hot tank 211 to the cooled mud tank 210$c$, e.g., through a cooling tower bypass line 230$b$. Such an operational configuration can be used when maintenance is required on the mud cooling tower 230 or during drilling operations wherein the temperature of the hot drilling materials mixture exiting the wellbore 201 does not require any additional cooling beyond the passive capabilities of the hot mud tank 211$h$.

In spite of the additional mud cooling capability that is provided by the mud cooling tower 230, at least some of the equipment of the system 200 remains directly exposed to the hot drilling mud 210$h$, and thus to drilling mud temperatures in excess of 200-225° F. In particular, this includes all equipment and valving upstream of the cooling tower 230, such as the shale shaker 206, the hot mud pump 231, and the like. Generally, this is because at least the largest of the drill cuttings 207 must be usually be separated from the hot drilling mud 210$h$ in the shale shaker 206 before the mud 210$h$ reaches the pump 231. Accordingly, all of the mechanical equipment in the system 200 that is located upstream of the mud cooling tower 230 can be detrimentally affected by the higher drilling mud temperatures that are otherwise inherent in geothermal drilling operations. Furthermore, prolonged exposure to such higher operating temperatures can increase the likelihood of premature equipment failures and associated costly rig downtime, and therefore often lead to more frequent and costly inspection and/or maintenance activities.

The present disclosure is directed to drilling mud systems and methods of operating the same that may be used to mitigate, or possibly even eliminate, at least some of the problems associated with the prior art drilling mud systems described above.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

Generally, the subject matter disclosed herein is directed to various new and unique systems, apparatuses, and methods for circulating and cooling drilling mud during wellbore drilling operations, including during high temperature drilling operations such as geothermal drilling operations and the like. In one illustrative embodiment, a system is disclosed that includes, among other things, a drilling mud cooling apparatus that is adapted to receive a flow of a mixture of drilling materials from a drilled wellbore during a drilling operation, and to cool the mixture from a first temperature to a second temperature, wherein the cooled mixture of drilling materials includes cooled drilling mud and drill cuttings. The disclosed system further includes a shale shaker apparatus that is adapted to receive a flow of the cooled mixture of drilling materials from the drilling mud cooling apparatus and to separate at least a portion of the drill cuttings from the cooled drilling mud.

In another illustrative embodiment, a drilling mud cooling apparatus includes a shell and a drilling mud flow plate mounted in the shell, the drilling mud flow plate being oriented at a flow angle relative to a horizontal plane and comprising an inlet end and an outlet end, wherein the inlet end of the drilling mud flow plate is adapted to receive, on an upper surface thereof, a flow of a mixture of drilling materials that includes drill cuttings and drilling mud that is returned from a wellbore drilling operation. Furthermore, the flow angle of the drilling mud flow plate is adapted to facilitate gravity flow of the mixture of drilling materials along a length of the drilling mud flow plate from the inlet end down to the outlet end. The drilling mud cooling apparatus also includes, among other things, first cooling means for cooling the flow of the mixture of drilling materials during the gravity flow thereof along the length of the drilling mud flow plate from the inlet end down to the outlet end.

Also disclosed herein is an exemplary method that is directed to, among other things, generating a flow of a mixture that includes drilling mud and drill cuttings from a drilled wellbore to a drilling mud cooling apparatus during a drilling operation, and cooling the flow of the mixture with the drilling mud cooling apparatus. The disclosed further includes generating a flow of the cooled mixture from the drilling mud cooling apparatus to a shale shaker apparatus, wherein the cooled mixture includes cooled drilling mud and cooled drill cuttings. Moreover, the method also includes separating at least a portion of the cooled drill cuttings from the cooled mixture, and after separating at least the portion of cooled drill cuttings from the cooled mixture, generating a flow that includes at least a portion of the cooled drilling mud from the shale shaker apparatus to a mud pump, and pumping at least the portion of the cooled drilling mud into the drilled wellbore with the mud pump.

BRIEF DESCRIPTION OF THE DRAWINGS

The disclosure may be understood by reference to the following description taken in conjunction with the accompanying drawings, in which like reference numerals identify like elements, and in which:

FIG. 4D is a top view of one illustrative cooling tube and heat transfer/drilling mud flow plate arrangement for the exemplary drilling mud heat exchanger of FIGS. 4A-4C when viewed along the view line "4D-4D" of FIG. 4A;

FIG. 4E is a sectional view of the illustrative cooling tube and heat transfer/drilling mud flow plate arrangement of FIG. 4D when viewed along the section line "4E-4E";

Figure 1:
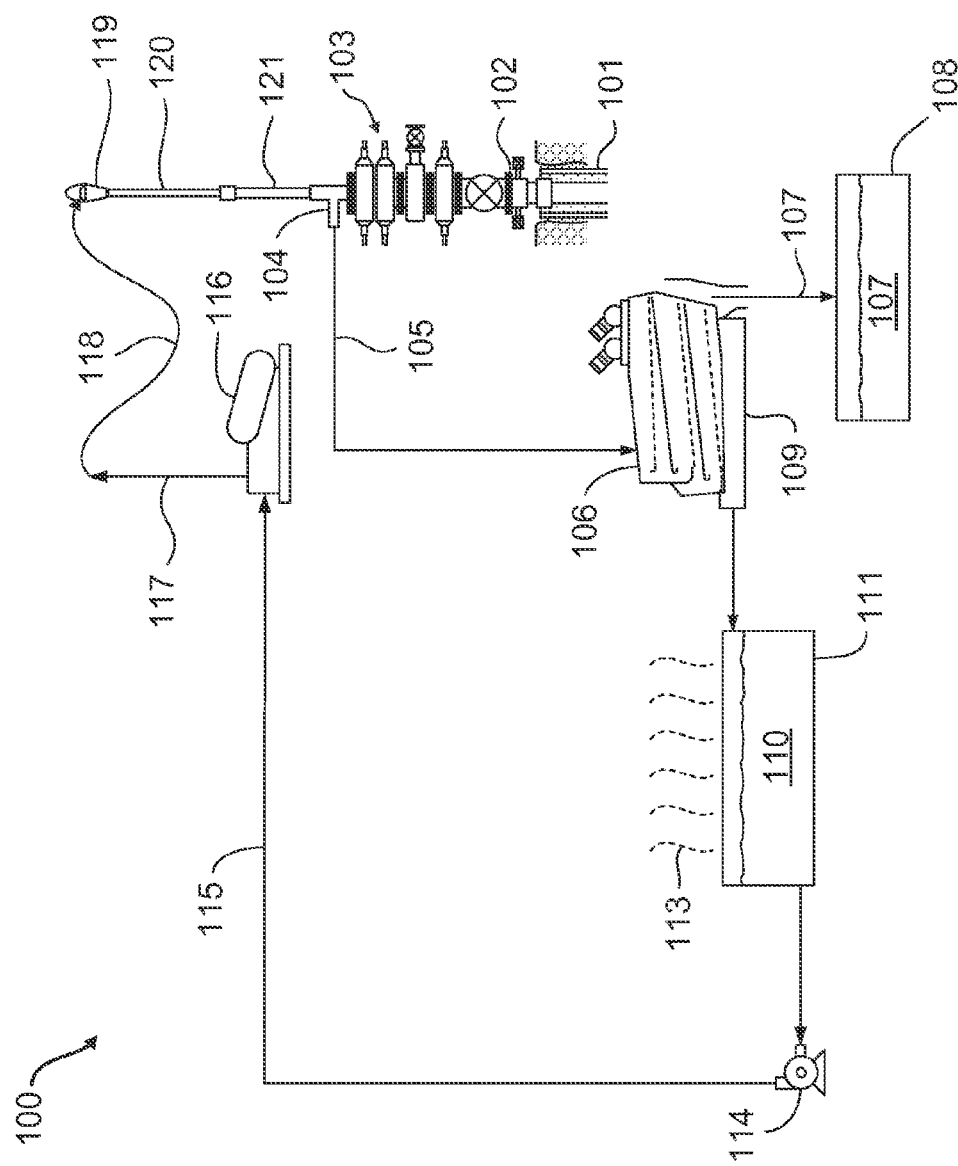
FIG. 1 schematically depicts an illustrative prior art drilling mud system.
Figure 2:
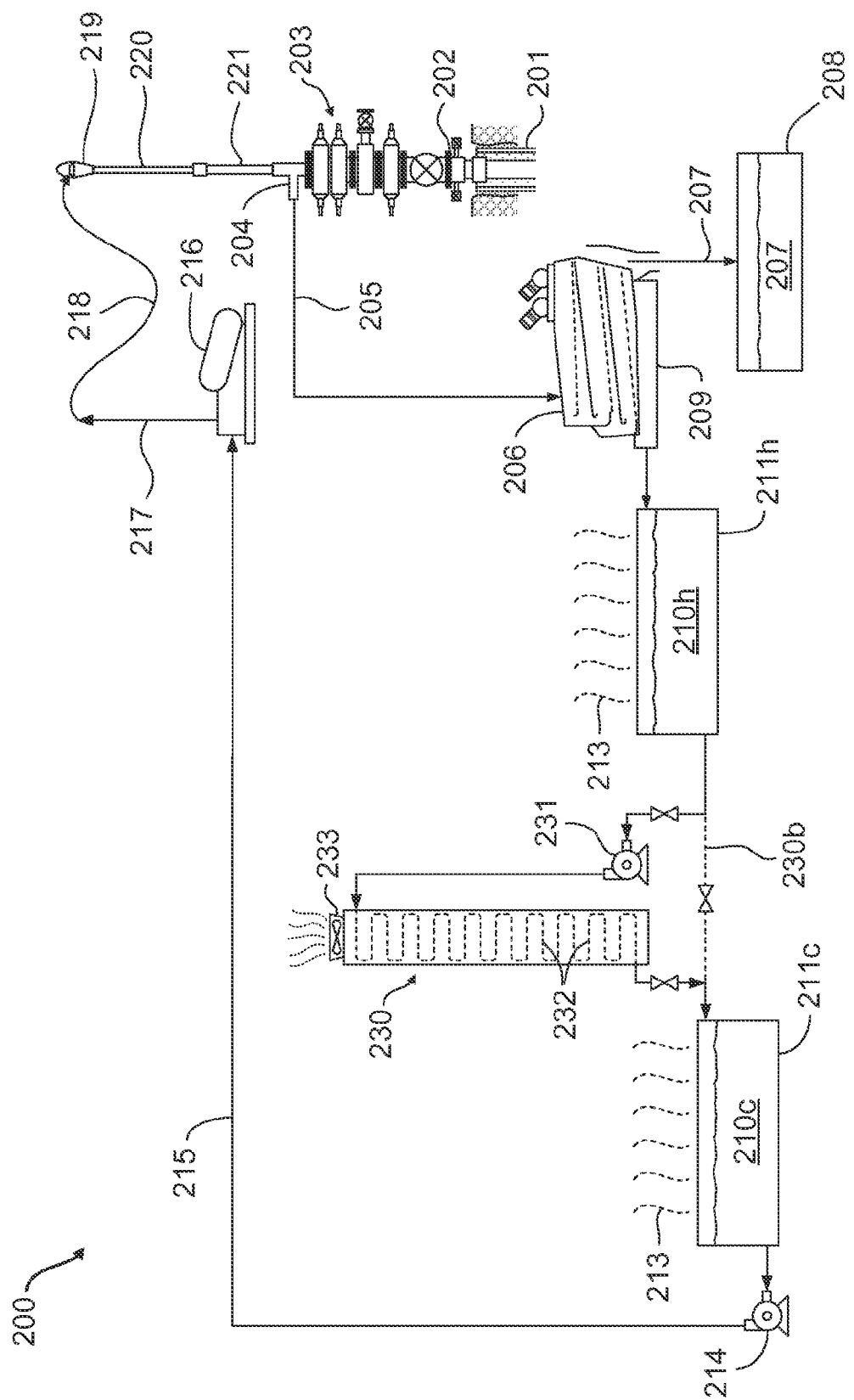
FIG. 2 schematically illustrates another exemplary prior art drilling mud system.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein provides various embodiments of systems, components, and methods that may be used to circulate and cool drilling mud during wellbore drilling operations, and in particular, during high temperature drilling operations, such as geothermal drilling operations and the like.

Figure 3A:
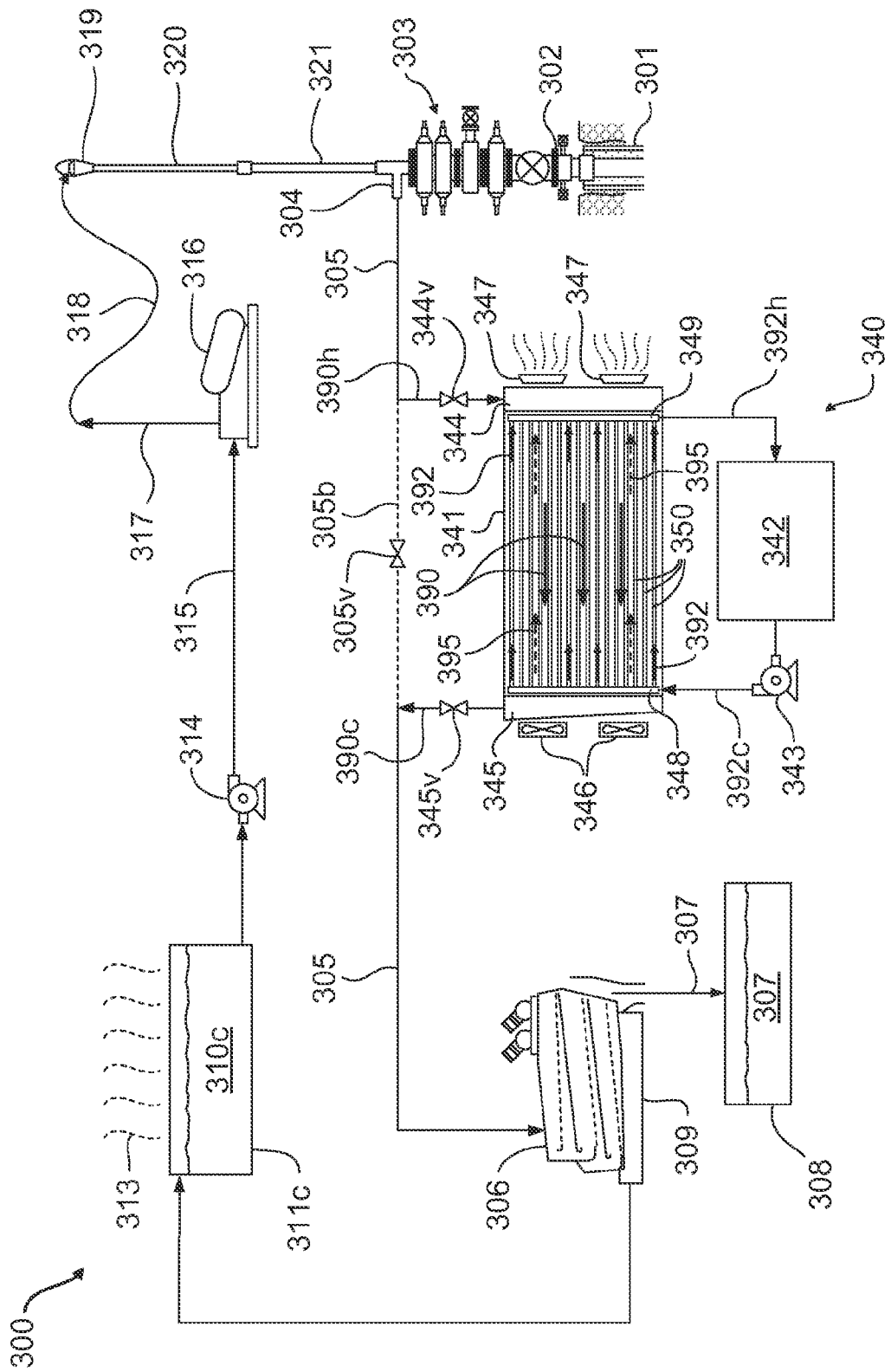
FIG. 3A schematically depicts one illustrative embodiment of a drilling mud system disclosed herein.

FIG. 3A schematically depicts one illustrative disclosed embodiment of a drilling mud system 300 that may be used to circulate, cool, and treat drilling mud during drilling operations, including during high temperature drilling operations such as geothermal drilling applications and the like. As shown in FIG. 3A, a blow-out preventer (BOP) 303 is positioned on a wellhead 302 as drilling operations progress on a wellbore 301. During operation, a mixture of hot drilling materials 390h is circulated out of the wellbore 301 and exits the BOP 303 through the bell nipple 304 and enters a mud flow line 305. In certain illustrative embodiments, such as when geothermal drilling operations are being performed through formation temperatures in the range of approximately 500-600° F., the temperature of the mixture of hot drilling materials 390h may be on the order of about 200-225° F. or even higher. In such cases, the flow line valve 305v in the flow line bypass section 305b is closed so that the mixture of hot drilling materials 390h can flow into a drilling mud cooler 340 through an inlet valve 344v, where the mixture may be cooled prior to being circulated back to the flow line 305 and into the shale shaker 306 where the drill cuttings 307 may be separated from the cooled drilling mud 310c, as will be further described below.

In some embodiments, the drilling mud cooler 340 may be adapted to reduce the temperature of the mixture of hot drilling materials 390h by approximately 10-40° F. For example, in at least one exemplary embodiment, the temperature of a mixture of cooled drilling materials 390c that exits the drilling mud cooler 340 through the outlet valve 345v may be in the range of about 160-185° F. or even lower, depending on the specific design and operating parameters of the drilling mud cooler 340.

After exiting the drilling mud cooler 340 through the outlet valve 345v, the mixture of cooled drilling materials 390c re-enters the flow line 305, through which it then flows to the inlet of drill cuttings separation equipment 306, which is adapted to substantially separate the undesirable drill cuttings 307 from the mixture of cooled drilling materials 390c. Depending on the particle sizes of the returning drill cuttings 307 and the degree of particle separation required, the drill cuttings separation equipment 306 may include first stage separating equipment, such as one or more vibratory separators (e.g., shale shakers), as well as second stage separating equipment, such as one or more hydrocyclone and/or centrifuge apparatuses. However, for simplicity of illustration and discussion, the drill cuttings separation equipment 306 has been schematically depicted in FIG. 3 as a shale shaker device, and therefore will hereafter be referred to as the shale shaker 306.

In the shale shaker (or shale shakers) 306, the mixture of cooled drilling materials 390c is treated so as to separate the drill cuttings 307, which are directed to a waste disposal tank or pit 308, from the cooled drilling mud 310c, which flows down into the sump 309 of the shale shaker 306. As shown in FIG. 3A, the cooled drilling mud 310c then flows from the sump 309 to a cooled mud tank 311c, where additional natural or passive cooling 313 of the drilling mud may occur based on the size of the mud tank 311c, ambient environmental conditions, and the like.

In some illustrative embodiments, the cooled drilling mud 310c may then flow from the cooled mud tank 311c to a mud pump 316 through the suction line 315. For example, and depending on the overall design and layout of the system 300, a mud booster pump 314 may be used to pump the cooled drilling mud 310c through the suction line 315 to the suction side of the mud pump 316. The mud pump 316 may then be operated so as to increase the pressure of the cooled drilling mud 310c and to discharge the pressurized drilling mud 310c to a standpipe 317. In certain embodiments, the cooled mud 310c may then flow through a rotary line 318 to swivel 319 mounted at the upper end of a kelly 320, which may then direct the cooled drilling mud 310c down to the drill pipe/drill string 321. Thereafter, the cooled drilling mud 310c may be recirculated down the drill string 321 to a drill bit (not shown), where it once again provides, among other things, the desired drill bit cooling, lubrication, and drill cutting removal tasks described above.

As noted previously, the bypass flow line valve 350v and the drilling mud cooler valves 344v and 345v may be operated so that the mixture of hot drilling materials 390h is circulated through and cooled by the drilling mud cooler 340 whenever the temperature of the mixture of hot drilling materials 390h may be above pre-established upper threshold limit, such as, for example, 185° F. As shown in the illustrative embodiment depicted in FIG. 3A, the drilling mud cooler 340 may include, among other things, a drilling mud heat exchanger 341 and a heat exchanger cooling unit 342. In at least some embodiments, the drilling mud heat exchanger 341 may include an inlet mud distribution trough 344 that is adapted to receive the mixture of hot drilling materials 390h flowing through the flow line 305 and the inlet valve 344v from the bell nipple 304 on the BOP 303. Furthermore, the inlet mud distribution trough 344 is adapted to substantially evenly distribute a flow of the mixture of drilling materials 390 across the width of a drilling mud flow plate 351 that is positioned above and in contact with a plurality of cooling tubes 350 (see, FIGS. 4A and 4D-4F). During operation of the drilling mud heat exchanger 341, the mixture of drilling materials 390 is cooled as it flows over the drilling mud flow plate 351—which therefore may sometimes be referred to hereinafter as a heat transfer plate 351. The cooled mixture of drilling materials 390c then flows into an outlet mud trough 345 that is adapted to receive the cooled mixture 390c from the heat transfer/drilling mud flow plate 351, and to direct the cooled mixture 390c through the outlet valve 354v and back to the flow line 305. Thereafter, the mixture of cooled drilling materials 390c flows to the shale shaker 306 so that the drill cuttings 307 may be separated from the cooled drilling mud 310c, as previously described.

In at least some exemplary embodiments, the drilling mud heat exchanger 341 may include dual cooling means for cooling the mixture of hot drilling materials 390h prior to separating the mixture in the shale shaker 306. In certain embodiments, a first cooling means may be provided by flowing a heat transfer fluid 392, such as water and the like, from the heat exchanger cooling unit 342 and through the plurality of cooling tubes 350 as the mixture of drilling materials 390 flows over the heat transfer plate 351. For example, a cooling fluid pump 343 may be used to pump a cooled heat transfer fluid 392c to an inlet distribution header 348 in the drilling mud heat exchanger 341 that is adapted to substantially evenly distribute the flow of cooled heat transfer fluid 392c into each of the cooling tubes 350. Thereafter, as shown in FIG. 3A, the heat transfer fluid 392 flows through each of the cooling tubes 350 in a counterflow configuration with respect to the flow direction of the mixture of drilling materials 390, during which time heat from the mixture of drilling materials 390 is transferred to the heat transfer fluid 392 through the heat transfer/drilling mud flow plate 351 (see, FIGS. 4A and 4D-4F). Hot heat transfer fluid 392h then enters the outlet header 349 of the drilling mud heat exchanger 341 and is circulated back to the heat exchanger cooling unit 342, where it is cooled as will be described in conjunction with FIGS. 3C and 3D below.

In certain illustrative embodiments, a second cooling means for cooling the mixture of hot drilling materials 390h may also be provided by generating a flow of cooling air 395 through the drilling mud heat exchanger 341 and over the flow of mixed drilling materials 390, again in a counterflow direction with respect to the flow direction of the materials 390. For example, in at least some embodiments, one or more cooling fans 346 may be positioned proximate the outlet mud trough 345, i.e., at the outlet end of the drilling mud heat exchanger 341 where the mixture of cooled drilling materials 390c exits the exchanger 341. The cooling fans 346 may then be operated to create a flow of cooling air 395 through the drilling mud heat exchanger 341 and over the mixture of drilling materials 390 as the mixture 390 flows over the heat transfer/drilling mud flow plate 351. In this way, additional heat may be transferred from the mixture of drilling materials 390 to the cooling air 395. Thereafter, the cooling air 395 may exit the drilling mud heat exchanger 341 via one or more exhaust air vents 347 positioned proximate the inlet mud distribution trough 344, that is, at the inlet end of the drilling mud heat exchanger 341 where the mixture of hot drilling materials 390h enters the exchanger 341.

It should be understood by those of ordinary skill after a complete reading of the present disclosure that the amount temperature drop between the temperature of the mixture of hot drilling materials 390h entering the drilling mud heat exchanger 341 and the temperature of the mixture of cooled drilling materials 390c exiting the drilling mud heat exchanger 341 may be adjusted based on various design and operating parameters of the drilling mud cooler 340. For example, the flow rate of cooling air 395 through the drilling mud heat exchanger 341 may be adjusted by controlling the rotational speed of the cooling fans 346, and/or by changing the size of the cooling fans 346. Furthermore, in some embodiments, the residence time of the mixture of drilling materials 390 within the drilling mud heat exchanger 341 may be adjusted and/or controlled as required. Moreover, the size of the drilling mud heat exchanger 341, and in particular the size of the heat transfer plate 351, may also be specified for particular applications. Additionally, the flow rate of heat transfer fluid 392 through the drilling mud heat exchanger 341 may also be adjusted and/or controlled, as well as the outlet set temperature for the cooled heat transfer fluid 392c exiting the heat exchanger cooling unit 342 and entering the inlet distribution header 348, based on the size and/or cooling capacity of the heat exchanger cooling unit 342, as will be further described with respect to FIGS. 3C and 3D below.

Furthermore, it should be understood that, in at least some illustrative embodiments, the drilling mud heat exchanger 341 may be configured and operated such that only the above-described first means for cooling the mixture of drilling materials 390, i.e., the heat exchanger cooling unit 342 and heat transfer fluid 392 circulation system, is employed during operation of the drilling mud cooler 340. Moreover, it should also be understood that in certain other embodiments only the second means for cooling the mixture of drilling materials 390, i.e., the cooling fans 346 and cooling air 395 flow system, may be used.

Figure 3B:
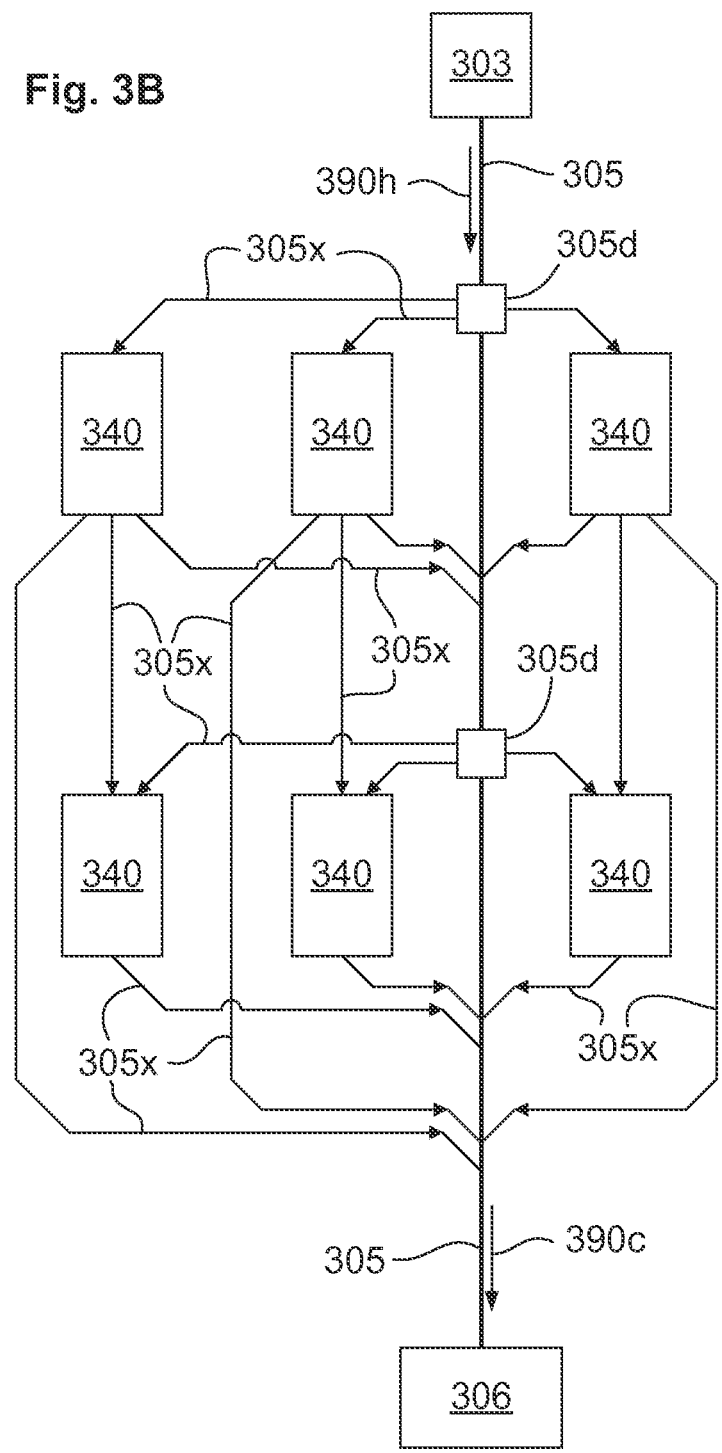
FIG. 3B schematically depicts an embodiment of a drilling mud system that utilizes a plurality of drilling mud coolers.

Depending on the overall design parameters of the drilling mud system 300, a plurality of drilling mud coolers 340 may be used to accomplish the requisite degree of mud cooling. FIG. 3B schematically illustrates one exemplary arrangement of a plurality of drilling mud coolers 340 that may be used for the system 300. As shown in FIG. 3B, one or more flow dividers 305d may be positioned in the mud flow line 305, which may be adapted to control the flow of a drilling fluid, such as the mixture of hot drilling materials 390h, flowing through the flow line 305 from the BOP 303 in a variety different manners, depending on the desired flow regime and mud cooling requirements. For example, in some embodiments, the flow dividers 305d may be controlled in such a manner as direct the mixture of hot drilling materials 390h to a specific one of the drilling mud coolers 340. In other embodiments, the flow dividers 305d may be controlled so as to divide the flow of hot drilling materials 390h and direct each portion of the divided flow mixture to a different drilling mud cooler 340.

Additionally, the various interconnecting flow lines 305x that provide fluid communication between the mud flow line 305, the flow dividers 305d, and the drilling mud coolers 340 may be configured with appropriate valving (not shown) and arranged in such a manner as to create a parallel flow regime between mud coolers 340, a series flow regime between mud coolers 340, or a combination of parallel and series flow regimes between mud coolers 340. For example, in the illustrative configuration shown in FIG. 3B, six drilling mud coolers 340 are depicted, although both a greater or fewer number of mud coolers 340 may also be used. In some embodiments, the flow dividers 305d may be controlled so as to generate series flow between a selected two of the drilling mud coolers 340, whereas appropriately located valving (not shown) may be operated so as to bypass the remaining four mud coolers 340. In other embodiments, the flow dividers 305d may be controlled so as to generate parallel flow between a selected two, three, four, five, or even all six of, the drilling mud coolers 340. In still other embodiments, the flow dividers may be operated so as to generate parallel flow between two pairs of drilling mud coolers 340, wherein each of the pairs of mud coolers 340 may be arranged in series. It should be understood, however, that the configuration depicted in FIG. 3B is exemplary only, as both the total number of drilling mud coolers 340 and the arrangement of interconnecting flow lines 305$x$ may be varied as required for a given mud cooling application. As shown in the FIG. 3B, the mixture of drilling materials flowing through the drilling mud coolers 340 is further controlled so that it is eventually returned to the flow line 305 as the mixture of cooled drilling materials 390$c$, which then flows into the shale shaker 306 for separation as previously described.

Figure 3C:
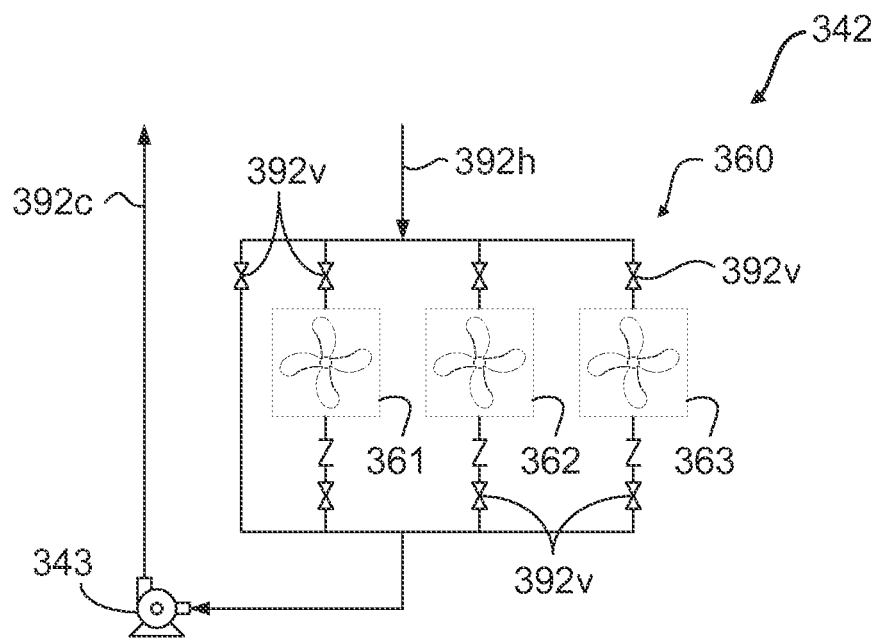
FIG. 3C schematically illustrates one exemplary embodiment of a heat exchanger cooling unit of the present disclosure.

FIG. 3C schematically depicts an exemplary heat exchanger cooling unit 342 in accordance with one illustrative embodiment of the present disclosure. As shown in FIG. 3C, the heat exchanger cooling unit 342 may include an air cooler system 360, which in turn may include one or more individual air cooler units 361, 362, 363. In some embodiments, any one or more of the individual air cooler units 361, 362, 363 may be, for example, radiator-type air coolers and the like, although other types of air coolers known in the art may also be used. In operation of the air cooler system 360 depicted in FIG. 3C, the hot heat transfer fluid 392$h$ exiting the drilling mud cooler 340 via the outlet header 349 (see, FIG. 3A) is circulated to the air cooler system 360, where it then flows through the one or more individual air cooler units 361, 362, 363 and at least some of the heat in the hot heat transfer fluid 392$h$ is dissipated to the surrounding environment. The cooled heat transfer fluid 392$c$ exiting the air cooler system 360 may then be pumped back to the drilling mud heat exchanger 341 by the cooling fluid pump 343.

It should be understood that the maximum total required cooling capacity for the air cooler system 360 may be established based upon the various design parameters of the individual air cooler units 361, 362, 363, such as fan size and/or fan speed, and total heat transfer surface area, and the like. Furthermore, while three air cooler units 361, 362, 363 are depicted in the embodiment shown in FIG. 3C, it should also be understood that the air cooler system 360 may include both fewer, i.e., one or two, as well as more, e.g., four or more, individual air cooler units, as may be required based upon the design parameters of the specific unit in question.

It should be understood that in certain embodiments, the individual air cooler units 361, 362, 363 may be arranged in parallel, such as is shown in FIG. 3C, although it should be understood that the air cooler units 361, 362, 363 may also be arranged in series, or in a combination of series and parallel, depending on the specific design parameters of the air cooler system 360. Furthermore, in those illustrative embodiments in which the air cooler system 360 includes a plurality of individual air cooler units 361-363, the cooling fluid cooling capacity of the cooling unit 342 may be controlled and/or adjusted by increasing or decreasing the number of individual air coolers on line and actively cooling at any given time. This may be accomplished by opening and/or closing appropriately positioned cooling fluid flow valves 392$v$ of the air cooler system 360, as shown in FIG. 3C.

Figure 3D:
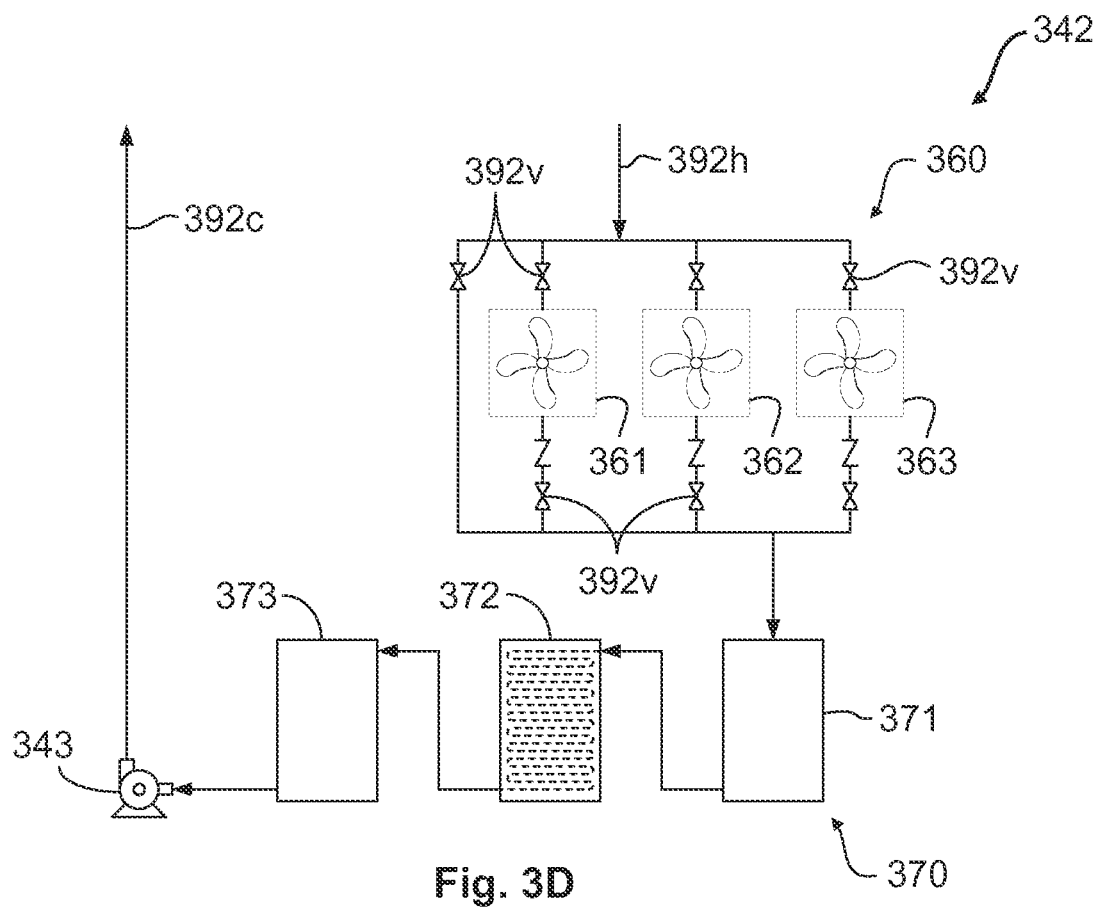
FIG. 3D schematically depicts another illustrative heat exchanger cooling unit disclosed herein.

FIG. 3D schematically depicts another illustrative heat exchanger cooling unit 342 in accordance with a further exemplary embodiment of the present disclosure in which a two-stage cooling system may be employed. For example, the heat exchanger cooling unit 342 shown in FIG. 3D may include a first stage air cooler system 360 that is arranged in series with a second stage refrigeration system 370. In certain illustrative configurations, the first stage air cooler system 360 may be substantially as described above with respect to the heat exchanger cooling unit 342 shown in FIG. 3C, and as such will not be further described herein. The second stage refrigeration system 370 may be included in those embodiments wherein the cooling capacity of the first stage air cooler system 360 may be insufficient for any one of several reasons, including the ambient environmental conditions at a specific drilling site, the maximum formation temperature at the drilling site, and/or the maximum temperature of the mixture of hot drilling materials 390$h$ exiting a drilled wellbore 301 (see, FIG. 3A) at any given time, and the like.

As shown in the illustrative heat exchanger cooling unit 342 depicted in FIG. 3D, the heat transfer fluid 392 exiting the first stage air cooler system 360 is circulated through the second stage refrigeration system 370, where the heat transfer fluid 392 is further cooled by the refrigeration unit 372. Thereafter, the cooling fluid pump 343 is used to pump the cooled heat transfer fluid 392$c$ back to the drilling mud heat exchanger 341, as previously described. In some embodiments, a first stage cooling fluid reservoir 371 may be used to stage an appropriate predetermined quantity of heat transfer fluid 392 after it has exited the first stage air cooler system 360, based on the overall design parameters of the heat exchanger cooling unit 342. The stored heat transfer fluid 392 is then circulated from the first stage cooling fluid reservoir 371 to the refrigeration unit 372 for further cooling, as previously described. In other illustrative embodiments, the cooled heat transfer fluid 392$c$ exiting the refrigeration unit 372 may be stored in a second stage cooling fluid reservoir 373, from which it is then pumped by the cooling fluid pump 343 to the drilling mud heat exchanger 341.

It should be understood by those of ordinary skill in the art after a complete reading of the present disclosure that for a given set of heat exchanger cooling unit 342 design requirements, the heat transfer capacity of the first stage air cooler system 360 may be balanced with the cooling capacity of the second stage refrigeration system 370 based on various factors. For example, the specific ambient environmental condition factors at a given drilling site may influence the overall size and heat transfer capabilities of the first stage air cooler system 360. On the other hand, certain local environmental and/or pollution restrictions may exist at other drilling sites, such as restrictions on the type of amount of refrigerant that can be used, which may ultimately affect the size and/or cooling capacity of the second stage refrigeration system 370, or even whether a refrigeration system is permissible. Accordingly, the use of the two-stage cooling system depicted in FIG. 3D and described above provides a greater degree of design flexibility when determining heat exchanger cooling unit 342 requirements for a given drilling application.

FIGS. 4A-4F depict various aspects and details of an exemplary drilling mud heat exchanger 341 accordingly to one illustrative embodiment of the present disclosure. As shown in the side elevation view illustrated in FIG. 4A, the drilling mud heat exchanger 341 has a container or shell 354 that is supported by a plurality of structural supports 353 positioned at opposing ends of the drilling mud heat exchanger 341. Furthermore, the drilling mud heat exchanger 341 may be mounted on a skid 352 that facilitates the loading and transportation of the drilling mud heat exchanger 341 on a truck/trailer (not shown) between various well drilling sites.

Figure 4A:
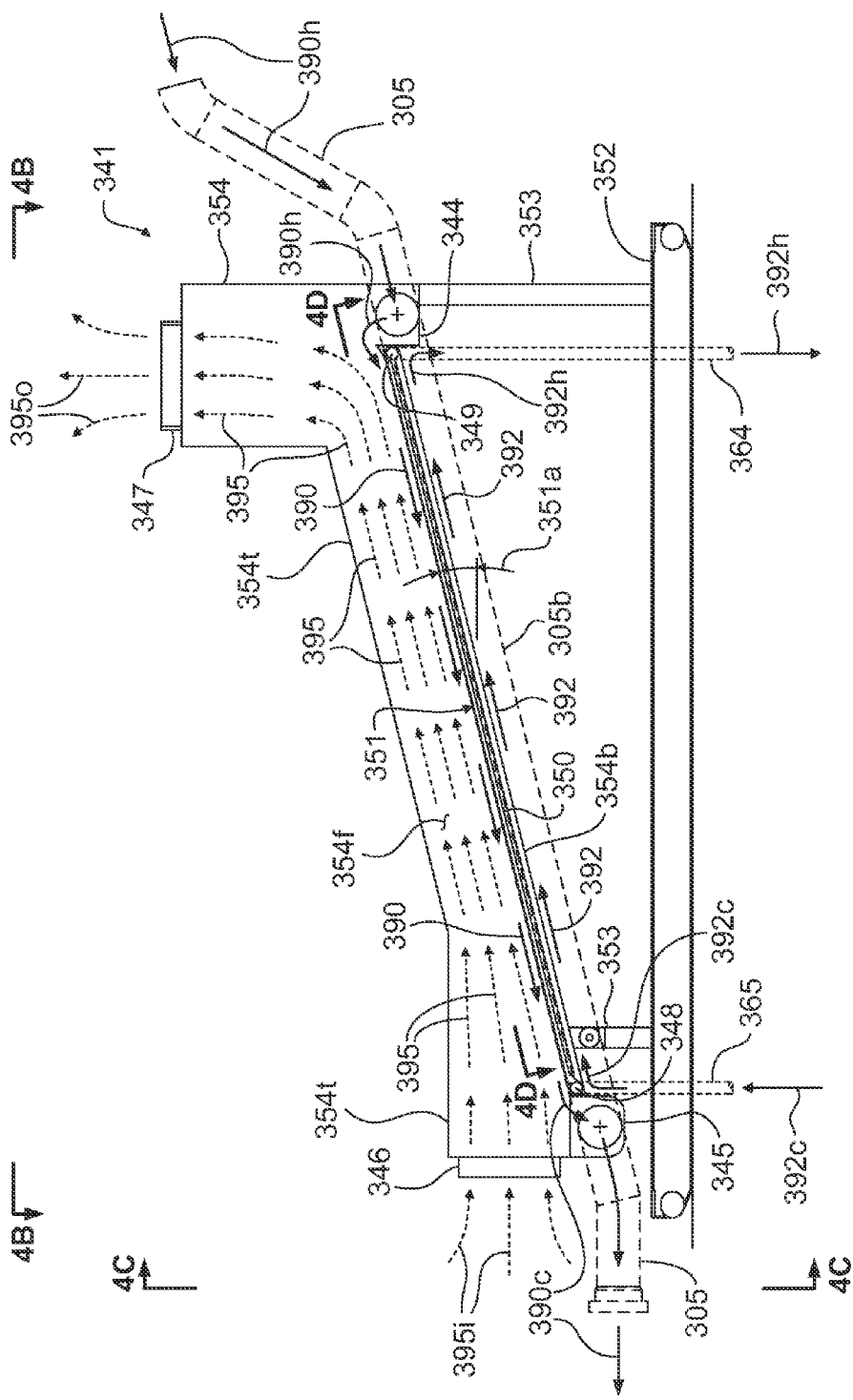
FIG. 4A is a side elevation view of an illustrative drilling mud heat exchanger of the present disclosure.

In certain illustrative embodiments, the heat transfer/drilling mud flow plate 351 is positioned adjacent to the floor, or bottom side, 354b of the shell 354, and furthermore may be oriented at an angle 351a relative to a horizontal plane. The angle 351a of the heat transfer plate 351 thereby substantially facilitates a gravity flow of the mixture of drilling materials 390 down the length of the heat transfer plate 351 from the upper inlet mud distribution trough 344—where the mixture of hot drilling materials 390h flowing through the flow line 305 from the wellbore 301 (see, FIG. 3A) enters the drilling mud heat exchanger 341—to the lower outlet mud trough 345—where the mixture of cooled drilling materials 390c exits the drilling mud heat exchanger 341 to the flow line 305. It should be appreciated that flow rate of the mixture of drilling materials 390 through the drilling mud heat exchanger 341, and consequently, the residence time of the mixture 390 in the heat exchange 341, may be controlled by adjusting the angle 351a of the heat transfer/drilling mud flow plate 351. Furthermore, as shown in FIG. 4A, each of the cooling tubes 350 may also be oriented at substantially the same angle 351a as the heat transfer plate 351, so that the tubes 350 remain close to and/or in contact with the heat transfer/drilling mud flow plate 351 between the lower outlet mud trough 345 and the upper inlet mud distribution trough 344. In this way, the amount of heat that is transferred from the mixture of hot drilling materials 390h through the heat transfer plate 351 and to the heat transfer fluid 392 flowing through the cooling tubes 350 may be substantially maximized.

In some exemplary embodiments, the cooled heat transfer fluid 392c may enter the inlet distribution header 348 from the heat exchanger cooling unit 342 (see, FIGS. 3A-3D) through an inlet pipe 365. The heat transfer fluid 392 may then flow from the inlet distribution header 348 through each of the various cooling tubes 350, during which time the heat transfer fluid 392 takes on at least some of the heat from the mixture of hot drilling materials 390h (as described previously) until it reaches the outlet header 349. Thereafter, the outlet header 349 gathers the flow of hot heat transfer fluid 392h from each of the cooling tubes 350 and circulates the hot fluid 392h back to the heat exchanger cooling unit 342 for cooling and recirculation.

As previously described with respect to FIG. 3A above, one or more cooling fans 346 may be positioned on the drilling mud heat exchanger 341 adjacent to the lower outlet mud trough 345, where they may be operated to generate a flow of cooling air 395 through the shell 354 of the exchanger 341 and over the mixture of drilling materials 390 as it flows down the length of the heat transfer/drilling mud flow plate 351, thus further cooling the mixture of drilling materials 390. As shown in FIG. 4A, the cooling fans 346 cause a flow of ambient inlet air 395i to flow into the shell 354, which is configured so that the cooling air 395 flows through a cooling air flow passage 354f. In some embodiments, the cooling air flow passage 354f may be substantially defined from above by the top side 354t of the shell 354, from below by an exposed upper flow surface 390s (see, FIG. 4E) of the mixture of drilling materials 390, and on either side by the sides 354s of the shell 354 (see, FIGS. 4B-4E). The cooling air 395 thus flows through the shell 354 and over the exposed upper flow surface of the mixture of drilling materials 390 for substantially the entire length the heat transfer/drilling mud flow plate 351, i.e., between the lower outlet mud trough 345 and the upper inlet mud distribution trough 344. Thereafter, a heated outlet air flow 395o is exhausted from the drilling mud heat exchanger 341 through the exhaust air vents 347 located at the uppermost end of the shell 354, as shown in FIG. 4A.

Figure 4B:
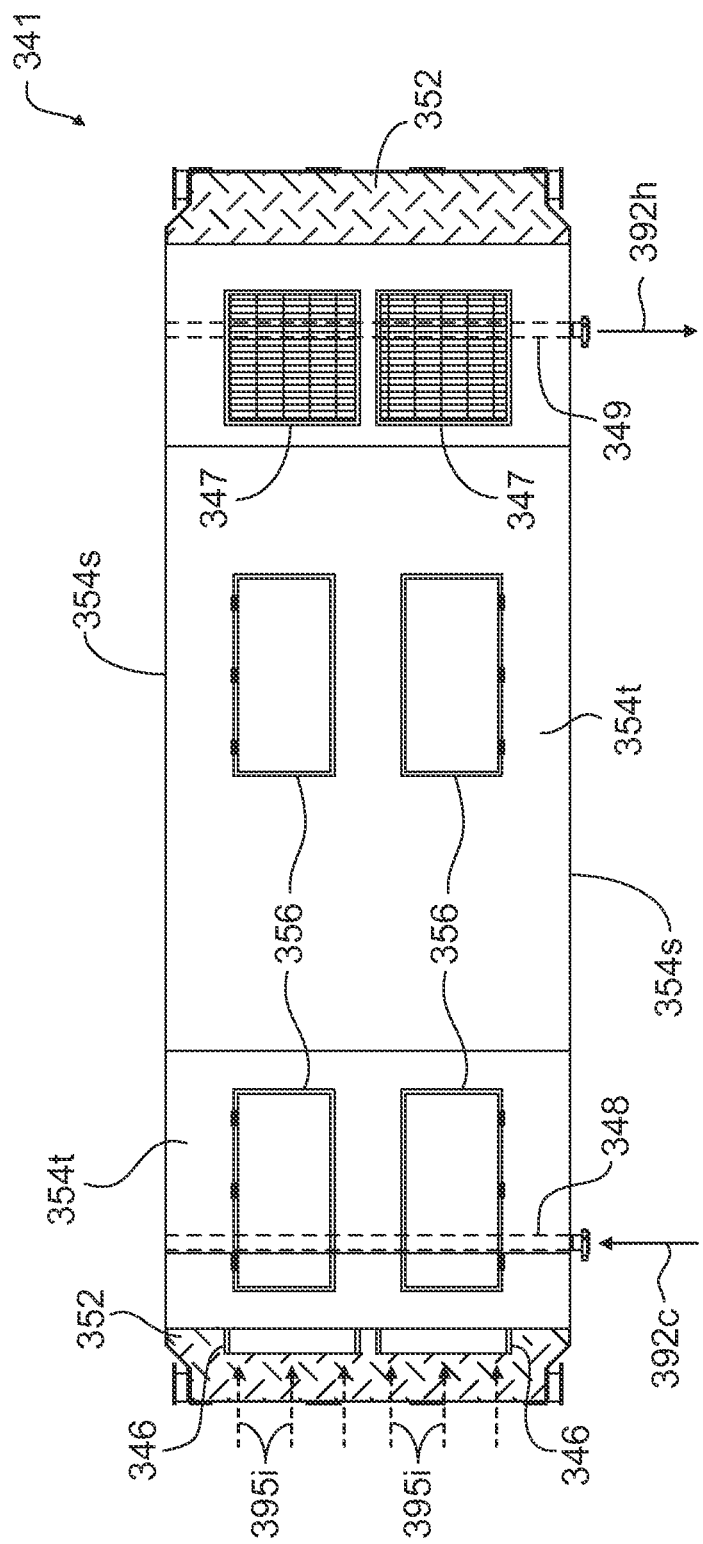
FIG. 4B is a plan view of the illustrative drilling mud heat exchanger when viewed along the view line "4B-4B" of FIG. 4A.

FIG. 4B is a top plan view of the exemplary drilling mud heat exchanger 341 depicted in FIG. 4A, that is, when viewed along the view line "4B-4B" of FIG. 4A. As shown in FIG. 4B, the drilling mud heat exchanger 341 may include a plurality of wash-down doors 356. In some embodiments, the wash-down doors 356 may be opened during shut-down and/or maintenance periods so as to enable the cleaning of the interior elements of the exchanger 341 that may be exposed to the flow of the mixture of drilling materials 390 during operation, including shell 354, the drilling mud flow plate 351, and the inlet and outlet troughs 344 and 345.

Figure 4C:
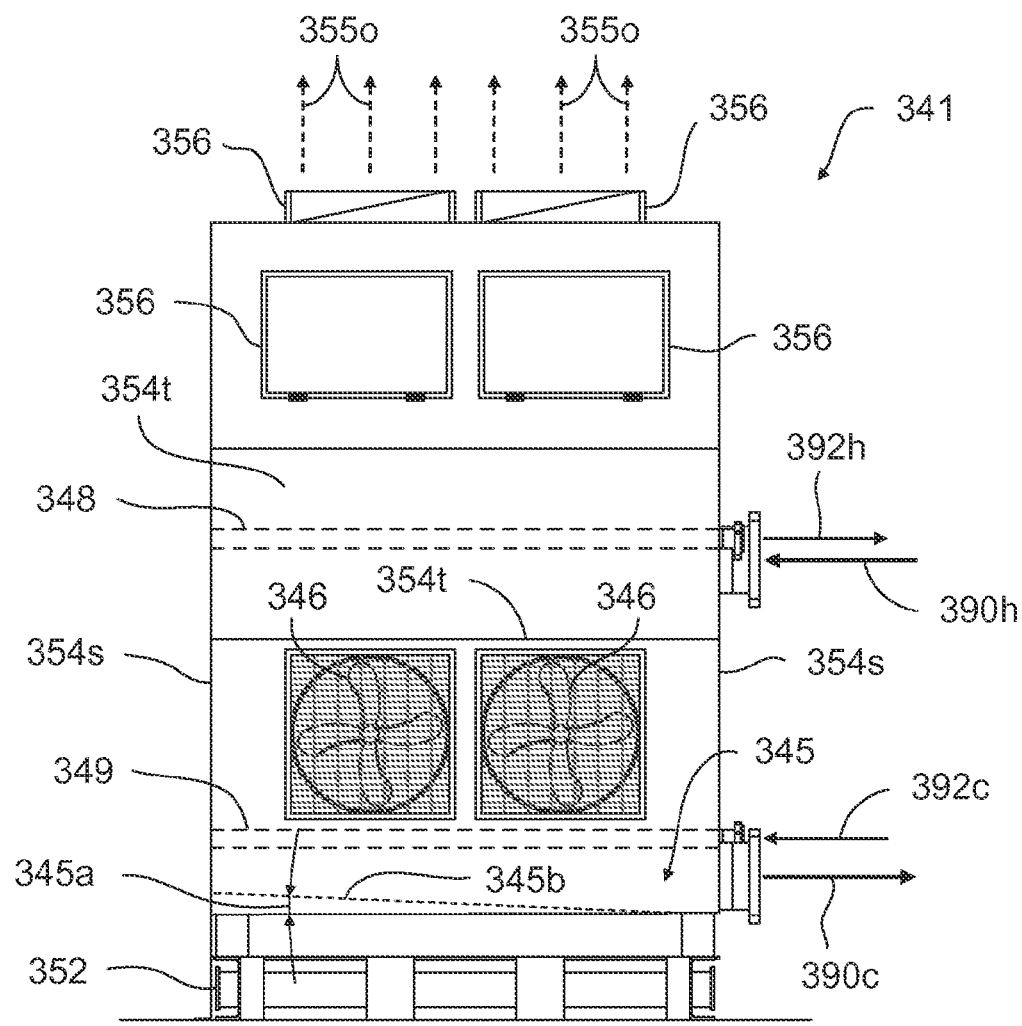
FIG. 4C is an end view of the exemplary drilling mud heat exchanger when viewed along the view line "4C-4C" of FIG. 4A.

FIG. 4C is an end elevation view of the illustrative drilling mud heat exchanger 341 of FIG. 4A, that is, when viewed along the view line "4C-4C" shown in FIG. 4A. As shown in FIG. 4C, the bottom surface 345b of the lower outlet mud trough 345 may be oriented at an angle 345a relative to horizontal, thus enabling the mixture of cooled drilling materials 390c that enter the lower trough 345 (by means of gravity flow) from the heat transfer/drilling mud flow plate 351 to flow out of the drilling mud heat exchanger 341 and back into the flow line 305 (see, FIGS. 3A and 4A).

Figure 4F:
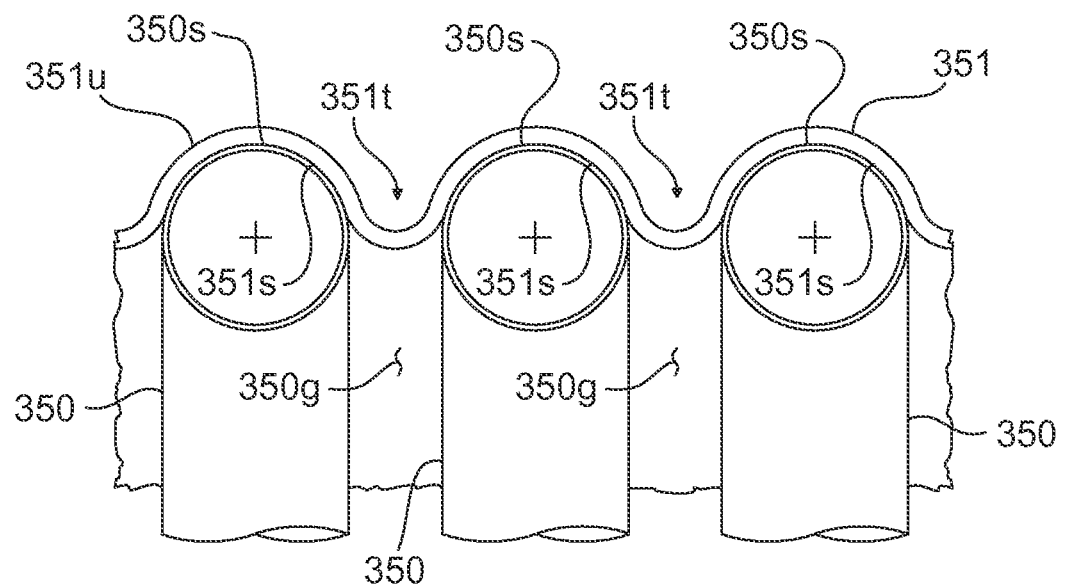
FIG. 4F is the close-up detailed view "4F" indicated in FIG. 4E, showing some illustrative aspects of the exemplary cooling tube and heat transfer/drilling mud flow plate arrangement of FIGS. 4D and 4E.
Figure 4G:
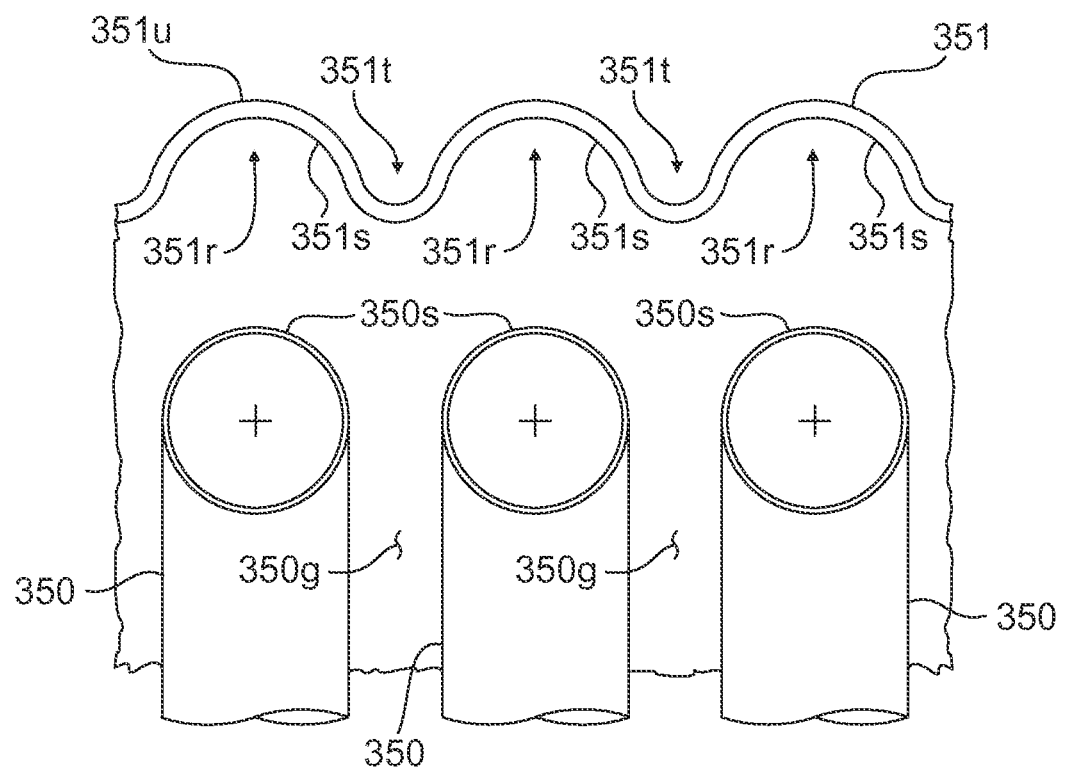
FIG. 4G illustrates an exploded version of the detailed view depicted in FIG. 4F.

FIGS. 4D-4G shows some exemplary detailed aspects of an illustrative arrangement of the cooling tubes 350 and heat transfer/drilling mud flow plate 351 in the drilling mud heat exchanger 341 depicted FIGS. 4A-4C. For example, FIG. 4D is a top view when viewed along the view line "4D-4D" shown in FIG. 4A that depicts one exemplary embodiment of a cooling tubes 350 and heat transfer/drilling mud flow plate arrangement, and FIG. 4E is a cross-sectional view of the cooling tubes 350 and heat transfer/drilling mud flow plate 351 arrangement of FIG. 4D when viewed along the section line "4E-4E" of FIG. 4D. Additionally, FIG. 4F is the close-up view "4F" indicated in FIG. 4E showing some illustrative details of the cooling tubes 350 and heat transfer/drilling mud flow plate 351 arrangement shown in FIGS. 4D and 4E, and FIG. 4G is an exploded version of the detailed view depicted in FIG. 4F.

As shown in FIGS. 4D-4F, the heat transfer/drilling mud flow plate 351 is positioned above, and extends substantially continuously over, each of the plurality of cooling tubes 350. Furthermore, the heat transfer/drilling mud flow plate 351 may be formed so as to have a roughly sinusoidal or "S" shaped configuration, such that the plate 351 is closely fitted to the upper curved surfaces 350s of each of the cooling tubes 350. See, FIGS. 4F and 4G. In this way, the shape of the heat transfer/drilling mud flow plate 351 may facilitate and/or enhance the transfer of heat between the mixture of drilling materials 390 flowing on the upper surface 351u of the plate 351 (see, e.g., FIG. 4E) and the heat transfer fluid 392 flowing through each of the cooling tubes 350.

For example, in certain embodiments, the heat transfer/drilling mud flow plate 351 may be shaped such that a series of troughs 351t are formed above the upper surface 351u of the plate 351 and a series of recesses 351r are formed below the lower surface 351s of the plate 351. Moreover, as shown in FIGS. 4E and 4F, when the heat transfer/drilling mud flow plate 351 is closely fitted to the cooling tubes 350 as described above, each one of the series of troughs 351t may be adapted to extend downward and fit between a corresponding space or gap 350g between adjacent cooling tubes 350. Additionally, each one of the series of recesses 351r may also be adapted to receive at least an upper portion of a corresponding cooling tube 350. Accordingly, when the heat transfer/drilling mud flow plate 351 is closely fitted to the plurality of cooling tubes 350, the troughs 351*t* may be nested within the gaps 350*g* between the tubes 350 and the tubes 350 may be nested within the recesses 351*r*. Therefore, during operation of the drilling mud heat exchanger 341, the mixture of drilling materials 390 flowing down along the upper surface 351*u* of the heat transfer/drilling mud flow plate 351 may fill each of the troughs 351*t* such that the drilling materials 390 substantially surround the upper portions of the cooling tube 350 where they are nested within the corresponding recesses 351*r*. See, FIG. 4E.

Furthermore, in at least some exemplary embodiments, the heat transfer/drilling mud flow plate 351 may be formed in such a manner that, when nested with the cooling tubes 350, at least a portion of the lower surface 351*s* of the heat transfer plate 351 within one or more of the recesses 350*r* contactingly engages at least a portion of the outer surface 350*s* of a respective corresponding cooling tube 350. Moreover, in at least one embodiment, the outer surface 350*s* of the upper portion of at least one of the cooling tubes 350 may substantially continuously contactingly engage the lower surface of the heat transfer plate 351 in the area where the tube 350 is nested within a respective recess 351*r*. In this way, the heat transfer characteristics between the cooling tubes 350 and the heat transfer plate 351 may be enhanced and/or substantially maximized.

Figure 5:
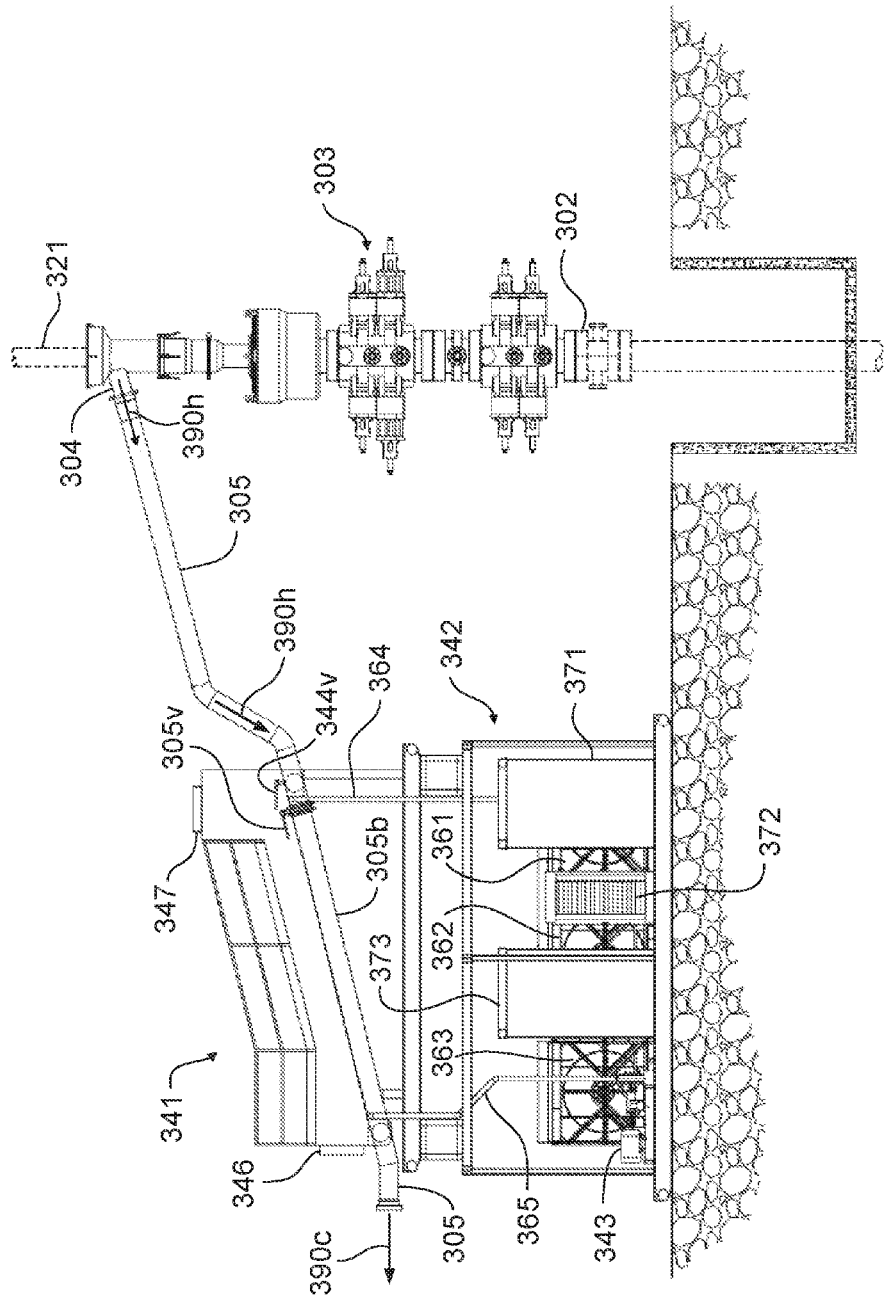
FIG. 5 is an elevation view showing one illustrative arrangement of the drilling mud cooling system disclosed herein.

FIG. 5 is an elevation view showing one illustrative arrangement of the drilling mud cooler 340 disclosed herein. As shown in the exemplary arrangement depicted in FIG. 5, the drilling mud cooler 340 may be configured such that the drilling mud heat exchanger 341 is positioned above, i.e., on top of, the heat exchanger cooling unit 342. Furthermore, both the drilling mud cooler 340 and the heat exchanger cooling unit 342 may be skid mounted so as to facilitate truck/trailer transportation between drilling sites.

As shown in FIG. 5, a mixture of hot drilling materials 390*h* may exit the bell nipple 304 positioned on the BOP 303, after which it may be transferred to the drilling mud cooler 340 at least partly by way of a gravity-assisted flow through the flow line 305. During operation of the drilling mud cooler 340, the flow line valve 305*v* may be closed so as to prevent the mixture of hot drilling materials 390*h* from flowing through the flow line bypass section 305*b*. Furthermore, the cooler inlet valve 344*v* may be opened so that the mixture of hot drilling materials 390*h* may flow into an upper inlet mud distribution trough 344 (see, FIGS. 3A and 4A) of the drilling mud heat exchanger 341, which then distributes a flow of the mixture 390*h* substantially across the width of a heat transfer/drilling mud flow plate 351 mounted inside of the heat exchanger 341 (see, FIG. 3D).

Based upon the angled orientation of the heat transfer/drilling mud flow plate 351 (see, FIG. 3D above), the mixture of hot drilling materials 390*h* may travel through the drilling mud heat exchanger 341 and down the length drilling mud flow plate 351 based upon a gravity-assisted flow, during which time it may be cooled by one or more alternative cooling means. For example, the mixture of hot drilling materials 390*h* may be cooled by a first cooling means which, as described above may include cooling the mixture 390*h* by way of a heat transfer fluid 392 that is circulated from the heat exchanger cooling unit 342 and through the cooling tubes 350 inside of the heat exchanger 341 by the cooling fluid pump 343. See, FIGS. 3A-3D and 4A-4G. In an alternative embodiment, the mixture of hot drilling materials 390*h* may be cooled as it flows down along the heat transfer/drilling mud flow plate 351 by a second cooling means which, as described above may include cooling the mixture 390*h* with a flow of cooling air 395 that is circulated through the shell 354 of the drilling mud heat exchanger 341 by the cooling fans 346. See, FIGS. 3A and 4A-4C. Moreover, the mixture of hot drilling materials 390*h* may also be cooled as it flows through the drilling mud heat exchanger 341 by a combination of both the first and second cooling means described above. Thereafter, the mixture of cooled drilling materials 390*c* may exit the drilling mud heat exchanger 341, where it is returned to the flow line 305 and flows to the shale shaker 306 for separation (see, FIG. 3A).

As a result, the subject matter disclosed herein provides details of various systems, apparatuses, and methods that may be used for circulating and cooling drilling mud during wellbore drilling operations, and in particular, during high temperature drilling operations such as geothermal drilling operations and the like.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended by the details of construction or design herein shown. It is therefore evident that the particular embodiments disclosed above may be altered or modified and all such variations are considered within the scope and spirit of the invention. Accordingly, the protection sought herein is as set forth in the claims below.

What is claimed:
1. A drilling mud cooling apparatus, comprising:
a shell;
a drilling mud flow plate mounted in said shell, said drilling mud flow plate being oriented at a flow angle relative to a horizontal plane and comprising an inlet end and an outlet end, said inlet end of said drilling mud flow plate being adapted to receive, on an upper surface thereof, a flow of a mixture of drilling materials comprising drill cuttings and drilling mud that is returned from a wellbore drilling operation, wherein said flow angle is adapted to facilitate gravity flow of said flow of said mixture of drilling materials along a length of said drilling mud flow plate from said inlet end down to said outlet end; and
first cooling means for cooling said flow of said mixture of drilling materials during said gravity flow thereof along said length of said drilling mud flow plate from said inlet end down to said outlet end, wherein said first cooling means comprises a plurality of cooling tubes positioned below a lower surface of said drilling mud flow plate, said plurality of cooling tubes being adapted to circulate a heat transfer fluid, each of said plurality of cooling tubes being oriented at said flow angle relative to horizontal.

2. A system, comprising:
the drilling mud cooling apparatus in accordance with claim 1, wherein said drilling mud cooling apparatus is adapted to receive said flow of said mixture of drilling materials from said drilled wellbore during said drilling operation and to cool said mixture from a first temperature to a second temperature, said cooled mixture of drilling materials comprising cooled drilling mud and drill cuttings; and
a shale shaker apparatus that is adapted to receive a flow of said cooled mixture of drilling materials from said drilling mud cooling apparatus and to separate at least a portion of said drill cuttings from said cooled drilling mud.

3. The system of claim 2, further comprising a mud pump that is adapted to receive a flow of at least a portion of said cooled drilling mud from said shale shaker apparatus and pump said at least said portion of said cooled drilling mud into said drilled wellbore during said drilling operation.

4. The system of claim 2, further comprising a drilling mud flow line coupled to said drilling mud cooling apparatus, said drilling mud flow line being adapted to facilitate said flow of said mixture of drilling materials from said drilled wellbore to said drilling mud cooling apparatus.

5. The system of claim 4, wherein said drilling mud flow line is further adapted to facilitate said flow of said cooled mixture of drilling materials from said drilling mud cooling apparatus to said shale shaker apparatus.

6. The system of claim 4, wherein said drilling mud flow line is further adapted to bypass said drilling mud cooling apparatus and to facilitate a flow of said mixture of drilling materials from said drilled wellbore to said shale shaker apparatus.

7. The system of claim 2, wherein said second temperature is at least approximately 20° F. less than said first temperature.

8. The system of claim 2, wherein said second temperature is at least approximately 40° F. less than said first temperature.

9. The system of claim 2, wherein said drilling mud cooling apparatus comprises a drilling mud heat exchanger that is adapted to cool said mixture of drilling materials from said first temperature to said second temperature.

10. The system of claim 2, wherein said drilling mud heat exchanger further comprises second cooling means for cooling said mixture of drilling materials, said second cooling means being different from said first cooling means.

11. The system of claim 10, wherein said first cooling means comprises a heat exchanger cooling unit, said heat exchanger cooling unit comprising said plurality of cooling tubes positioned below said lower surface of said drilling mud flow plate.

12. The system of claim 11, wherein said heat exchanger cooling unit comprises an air cooler apparatus.

13. The system of claim 12, wherein said heat exchanger cooling unit further comprises a refrigeration apparatus.

14. The system of claim 10, wherein said second cooling means comprises one or more cooling fans, said one or more cooling fans being adapted to generate a flow of cooling air through said drilling mud heat exchanger and across said flow of said mixture of drilling materials.

15. The system of claim 2, further comprising at least one further drilling mud cooling apparatus, wherein said at least one further drilling mud cooling apparatus is arranged for at least one of series and parallel flow operation with said drilling mud cooling apparatus.

16. The drilling mud cooling apparatus of claim 1, wherein said drilling mud flow plate is shaped so as to have a series of troughs formed above said upper surface and a series of recesses formed below said lower surface, each of said series of troughs being adapted to extend down and fit between a corresponding adjacent pair of said plurality of cooling tubes, and each of said series of recesses being adapted to at least partially receive an upper portion of a corresponding cooling tube.

17. The drilling mud cooling apparatus of claim 16, wherein at least a portion of an outer surface of said upper portion of at least one of said plurality of cooling tubes contactingly engages at least a portion of said lower surface of said drilling mud flow plate within a corresponding one of said series of recesses.

18. The drilling mud cooling apparatus of claim 1, further comprising second cooling means for cooling said flow of said mixture of drilling materials during said gravity flow thereof along said length of said drilling mud flow plate from said inlet end down to said outlet end, said second cooling means being different from said first cooling means.

19. The drilling mud cooling apparatus of claim 18, wherein said second means for cooling said flow of said mixture of drilling materials comprises one or more cooling fans, said one or more cooling fans being adapted to generate a flow of cooling air through a cooling air flow passage that is substantially defined by said shell and by an exposed upper flow surface of said mixture of drilling materials.

20. The drilling mud cooling apparatus of claim 1, further comprising:
an upper inlet mud distribution trough positioned adjacent to said inlet end of said drilling mud flow plate, said upper inlet mud distribution trough being adapted to receive said flow of said mixture of drilling materials returned from said wellbore drilling operation, distribute said flow of said mixture of drilling materials across a width of said drilling mud flow plate, and generate said gravity flow down said drilling mud flow plate; and
a lower outlet mud trough positioned adjacent to said outlet end of said drilling mud flow plate, said lower outlet mud trough being adapted to receive said cooled flow of said mixture of drilling materials from said lower end of said drilling mud flow plate and to generate a flow of said cooled flow of said mixture of drilling materials out of said drilling mud cooling apparatus.

21. A method, comprising:
generating a flow of a mixture comprising drilling mud and drill cuttings from a drilled wellbore to a drilling mud cooling apparatus during a drilling operation;
cooling said flow of said mixture with said drilling mud cooling apparatus, wherein cooling said mixture with said drilling mud cooling apparatus comprises:
generating a gravity flow of said mixture along an upper surface of an angled heat transfer plate mounted in said drilling mud cooling apparatus;
positioning a plurality of cooling tubes below said heat transfer plate such that at least a portion of an outer surface of one or more of said plurality of cooling tubes contactingly engages a least a portion of a bottom surface of said heat transfer plate; and
circulating a flow of heat transfer fluid through said plurality of cooling tubes;
generating a flow of said cooled mixture from said drilling mud cooling apparatus to a shale shaker apparatus, said cooled mixture comprising cooled drilling mud and cooled drill cuttings;
separating at least a portion of said cooled drill cuttings from said cooled mixture;
after separating at least said portion of cooled drill cuttings from said cooled mixture, generating a flow comprising at least a portion of said cooled drilling mud from said shale shaker apparatus to a mud pump; and
pumping said at least said portion of said cooled drilling mud into said drilled wellbore with said mud pump.

22. The method of claim 21, wherein cooling said mixture with said drilling mud cooling apparatus further comprises generating a flow of cooling air through said drilling mud cooling apparatus, said flow of cooling air flowing across and contacting an exposed upper flow surface of said mixture as said mixture flows down said angled heat transfer plate.

23. The method of claim 21, wherein positioning said plurality of cooling tubes below said heat transfer plate comprises shaping said heat transfer plate to include a plurality of recesses below said bottom surface thereof and nesting each of said plurality of cooling tubes in a corresponding one of said plurality of recesses.

24. The method of claim 21, further comprising cooling said flow of said heat transfer fluid after circulating said heat transfer fluid through said plurality of cooling tubes.

25. The method of claim 24, wherein cooling said flow of said heat transfer fluid comprises circulating said flow of said heat transfer fluid through one or more air cooler units.

26. The method of claim 24, wherein cooling said flow of said heat transfer fluid comprises circulating said flow of said heat transfer fluid through a refrigeration unit.

27. A drilling mud cooling apparatus, comprising:
a shell;
a drilling mud flow plate mounted in said shell, said drilling mud flow plate being oriented at a flow angle relative to a horizontal plane and comprising an inlet end and an outlet end, said inlet end of said drilling mud flow plate being adapted to receive, on an upper surface thereof, a flow of a mixture of drilling materials comprising drill cuttings and drilling mud that is returned from a wellbore drilling operation, wherein said flow angle is adapted to facilitate gravity flow of said flow of said mixture of drilling materials along a length of said drilling mud flow plate from said inlet end down to said outlet end;
a plurality of cooling tubes positioned below a lower surface of said drilling mud flow plate, wherein said plurality of cooling tubes are oriented at said flow angle relative to horizontal and are adapted to circulate a heat transfer fluid for cooling said flow of said mixture of drilling materials; and
one or more cooling fans that are adapted to generate a flow of cooling air through said shell for cooling said flow of said mixture of drilling materials.

28. The drilling mud cooling apparatus of claim 27, wherein said drilling mud flow plate is shaped so as to have a series of troughs formed above said upper surface and a series of recesses formed below said lower surface, each of said series of troughs being adapted to extend down and fit between a corresponding adjacent pair of said plurality of cooling tubes, and each of said series of recesses being adapted to at least partially receive an upper portion of a corresponding cooling tube.

29. The drilling mud cooling apparatus of claim 27, further comprising at least one cooling apparatus that is adapted to cool the heat transfer fluid that is adapted to be circulated through said plurality of cooling tubes.

30. The drilling mud cooling apparatus of claim 29, where said at least one cooling apparatus comprises at least one of an air cooler apparatus and a refrigeration apparatus.

* * * * *